United States Patent [19]
Lagerquist et al.

[11] Patent Number: 5,867,001
[45] Date of Patent: Feb. 2, 1999

[54] TRIM CIRCUITRY AND METHOD FOR ACCURACY IN CURRENT SENSING

[75] Inventors: Rolf Lagerquist, Dallas; William R. Krenik, Garland; Kenneth J. Maggio, Dallas; Patrick G. O'Farrell, Plano, all of Tex.

[73] Assignee: Texas Instruments Incorporated, Dallas, Tex.

[21] Appl. No.: 925,242

[22] Filed: Sep. 8, 1997

Related U.S. Application Data

[60] Provisional application No. 60/026,187 Sep. 19, 1996.
[51] Int. Cl.$^6$ ....................................................... H02P 7/00
[52] U.S. Cl. ........................................... 318/439; 318/254
[58] Field of Search ................................... 318/254, 439, 318/138

[56] References Cited

U.S. PATENT DOCUMENTS

| | | | |
|---|---|---|---|
| 4,490,661 | 12/1984 | Brown et al. | 318/661 |
| 4,535,276 | 8/1985 | Yokobori | 318/254 |
| 5,010,282 | 4/1991 | Moberg | 318/254 |
| 5,030,897 | 7/1991 | Ohtani et al. | 318/139 |
| 5,041,773 | 8/1991 | Takahashi | 318/696 |
| 5,194,786 | 3/1993 | Smith et al. | 318/254 |
| 5,493,189 | 2/1996 | Ling et al. | 318/254 |
| 5,585,701 | 12/1996 | Kaida et al. | 318/254 |

OTHER PUBLICATIONS

"*Integrated Current Regulation for a Brushless ECM Drive*", Thomas Jahns, et al., IEEE Transactions on Power Electronics, vol. 6, No. 1, Jan. 1991, pp. 118–126.

"*A Novel High Voltage Three–Phase Monolithic Inverter IC with Two Current Levels Sensing*", Hideki Miyazaki et al., Proceedings of the International Symposium on Power Semiconductor Devices and IC's Apr. 1991, pp. 248–253.

Primary Examiner—Jonathan Wysocki
Attorney, Agent, or Firm—W. Daniel Swayze, Jr.; Wade James Brady, III; Richard L. Donaldson

[57] ABSTRACT

A motor driver circuit (12) for providing drive signals to stator coils of a polyphase dc motor (10) includes a plurality of current paths, each connected between a supply voltage and a reference potential. Each current path includes two driver transistors (14,20, 16,22, 18,24), a node (A, B, C) of each of the stator coils being connectable between the driver transistors in respective current flow paths. A commutator (26) is connected to operate the driver transistors in a sequence in which drive currents are delivered for application in a predetermined sequence to the stator coils. A plurality of sensing transistors (32) are connected to produce a mirror current which mirrors a mirrored current in an associated driver transistor (20) in a respective current flow path. Circuitry (26) is provided which is responsive to the mirror currents of the sensing transistors to control the amplitudes of the currents in the associated driver transistor in a respective current flow path. At least one trim transistor (51–55) is connected in parallel with a respective one of the sensing transistors (50), and a programmable circuit (48) is connected to selectively activate the at least one trim transistor to adjust the amplitudes of the mirrored currents in the current flow path with which the sensing transistor with which the at least one trim transistor is associated.

24 Claims, 3 Drawing Sheets

TRIM CIRCUITRY AND METHOD FOR ACCURACY IN CURRENT SENSING

This is a prov. appl. of 60-026,187, filed Sep. 19, 1996.

BACKGROUND OF THE INVENTION

1. Field of the Invnetion

This invention relates to improvements in driver circuits and methods for polyphase dc motors, and more particularly to improvements in circuitry and methods for sensing currents in power driver transistors for polyphase dc motors, and still more particularly to improvements in circuits and methods for improving the accuracy of current sensing in polyphase dc motor driving circuits.

2. Relevant Background

Typical hard disks, such as used in personal computers, CD-ROM drives, and like applications typically are rotated by polyphase dc motors. A polyphase dc motor, and, in particular, a three phase dc motor, which is widely used in such applications, has three coils connected between respective nodes A, B, C, and a common center tap node, CT. As current is commutatively applied to flow through successive sets of the coils, a rotor is caused to rotate in synchronism with the commutation frequency. Typically the current is applied to flow through the coils in a sequence as follows: AC, BC, BA, CA, CB, and AB.

The currents are controlled by a current driver circuit, which typically includes three current paths, each including two driver transistors. The driver transistors may be, for example, FET devices. Each current path is connected between $V_{CC}$ and ground with the coil nodes A, B, and C connected respectively between each set of driver transistors. The driver transistors between the coil nodes and $V_{CC}$ are generally referred to as the "high side drivers" and the transistors connected between the coil nodes and ground are generally referred to as "low side drivers." A commutation circuit sequentially applies control voltages to the gates of the respective high and low side drivers to cause currents to flow in the motor coils in the sequence described above.

Typically, the currents in the respective current flow paths of the driver circuit are desirably equal, but due to variations in fabrication processes, mask alignments, and so on, the FET driver transistors in the respective paths typically have tolerances, for instance, in their channel widths or lengths, resulting in inequalities in the respective currents. As a result, noise and other undesirable effects result. Such unequal currents also reduce the precision of the motor speed. As densities of hard disk drivers become greater and greater, such imprecisions result in limitations on the densities that might be achieved in a particular hard disk drive.

In HDD-servo applications it is customary to use an expensive high tolerance external sensing resistor as a mean to measure the motor current. Recently, it has been suggested to replace the external sensing resistor with an internal FET device, which generally saves cost and printed circuit board area.

Thus, to detect the currents flowing in the power transistors in the current flow paths of the motor, FET devices may be connected as current mirrors to mirror the current in the power transistors, generally the low-side driver transistors. The mirror transistors are typically made small compared to the size of the power transistors, ratios of 15/1 being typical. It is, however, desirable to make the mirror transistors very small in comparison to the power transistors, but design tolerances result in greater imprecision amongst various mirroring transistors as the size ratio increases.

However, the use of such FET mirror devices often produces poor accuracy because of the large size difference between the power devices and the mirror devices. Normally current flowing through one transistor can be mirrored to another transistor with relatively good accuracy if the devices are of similar size. In motor driver applications, for power FET devices where there are amps of current flowing in the primary devices, it is desirable to use a large ratio (on the order, for example, of 1500:1) between the power FET and the mirror device. If a smaller ratio were to be used, a large amount of power would be wasted in the control circuitry because of the large current in the mirror device. However, with a mirror ratio at the order of 1500:1, the mirror accuracy will not be very good, and can be expected to vary on lot and device basis.

Moreover, in a 3-phase motor, for example, current sensing technology using FET devices requires mirroring of currents from three different current devices. Since variations among the power devices generally exist, the motor current in each of the three phases varies as the motor commutates from phase to phase. In addition to causing torque ripple, a varying motor current may create drive resonances and audible drive noise in the 2–4 kHz range, which is a typical commutation frequency.

What is needed, therefore, is a circuit and method that provide phase current accuracy through mirror transistors of relatively small size, to remove a source of torque ripple, audible noise, and motor inaccuracies.

SUMMARY OF THE INVENTION

By using the proposed circuit the phase to phase current accuracy may also be trimmed removing a source of torque ripple and audible noise. This is done making the width (W) of the mirror device variable. This is achieved by splitting the mirror device into several smaller devices. The gate voltage on the smaller devices are switched between the power devices gate voltage and zero volts, for n-channel devices.

Depending on the expected variation in the matching of the nominal power and mirror devices, the trim range of the mirror device can be chosen. The accuracy of the power to mirror device ratio is determined by the trim range, and the number of bits used to trim the device.

Thus, according to a broad aspect of the invention, a method is presented for adjusting a driver for a polyphase dc motor in which a plurality of currents are commutatively applied to selective sets of motor coils. The method includes measuring a first commutatively applied current that is applied to a first set of coils of the polyphase dc motor. A second commutatively applied current that is applied to a second set of coils of the polyphase dc motor is measured, and a magnitude of the first commutatively applied current is changed to more closely equal a magnitude of the second commutatively applied current from an original magnitude. If desired, a third commutatively applied current that is applied to a third set of motor coils is measured, and a magnitude of the third commutatively applied current is changed to more closely equal a magnitude of the second commutatively applied current from an original magnitude.

The step of changing a magnitude of the first commutatively applied current may include selectively connecting at least one active device, which may be an FET device, having a current path in parallel with an active device connected to mirror a current in a power transistor, which may be an FET power device. The FET devices may have different channel width ratios.

According to another broad aspect of the invention, a method is presented for adjusting a driver for a polyphase dc motor of the type having sets of motor windings. The method includes commutatively applying motor drive currents to selected sets of the motor windings, and measuring the amplitude of at least two of the drive currents. The amplitude of at least one of the at least two drive currents is changed to make the at least two drive currents substantially equal.

According to yet another broad aspect of the invention, a circuit is presented for operating a polyphase dc motor. The circuit includes a driver circuit for controlling currents flowing in current paths that include respective sets of coils of a polyphase dc motor to which the driver circuit is connectable, and a plurality of circuits, which may include FET power and sensing devices, for sensing and controlling the currents in respective ones of the current paths. Programmable circuitry is connected to adjust at least one of the sense current circuits to control a current flowing through at least one set of coils of the polyphase motor to substantially equal a current flowing through at least one other set of coils of the polyphase motor. The FET devices may be connected in parallel, wherein the programmable circuit programmably selects the FET devices to control an effective channel width provided by the FET devices.

According to yet another broad aspect of the invention, a motor driver circuit is presented for providing drive signals to stator coils of a polyphase dc motor, which may be, for example, a three-phase motor. The motor driver circuit includes a plurality of current paths, each connected between a supply voltage and a reference potential. Each current path includes two driver transistors, a node of each of the stator coils being connectable between the driver transistors in respective current flow paths. A commutator is connected to operate the driver transistors in a sequence in which drive currents are delivered for application in a predetermined sequence to the stator coils. A plurality of sensing transistors are each connected to produce a mirror current which mirrors a mirrored current in an associated driver transistor in a respective current flow path. Circuitry is provided which is responsive to the mirror currents of the sensing transistors to control the amplitudes of the currents in the associated driver transistor in a respective current flow path. At least one trim transistor is connected in parallel with a respective one of the sensing transistors, and a programmable circuit is connected to selectively activate the at least one trim transistor to adjust the amplitudes of the mirrored currents in the current flow path with which the sensing transistor with which the at least one trim transistor is associated.

According to yet another broad aspect of the invention, a motor assembly is presented. The motor assembly includes a polyphase dc motor having a plurality of stator coils. A plurality of current paths are provided. Each current path is connected between a supply voltage and a reference potential, and includes two driver transistors. A node of each of the stator coils is connected between the driver transistors in respective current flow paths. A commutator is connected to operate the driver transistors in a sequence to deliver drive currents in a predetermined sequence to the stator coils. A plurality of sensing transistors are each connected to produce a mirror current which mirrors a mirrored current in an associated driver transistor in a respective current flow path. At least one trim transistor is connected in parallel with a respective one of the sensing transistors, and a programmable circuit is connected to selectively activate said at least one trim transistor to adjust the amplitudes of the mirrored currents in the current flow path with which the sensing transistor with which the at least one trim transistor is associated. The sensing and trim transistors may be, for example, FET devices.

BRIEF DESCRIPTION OF THE DRAWING

The invention is shown in the accompanying drawing, in which.

And

Figure 5:
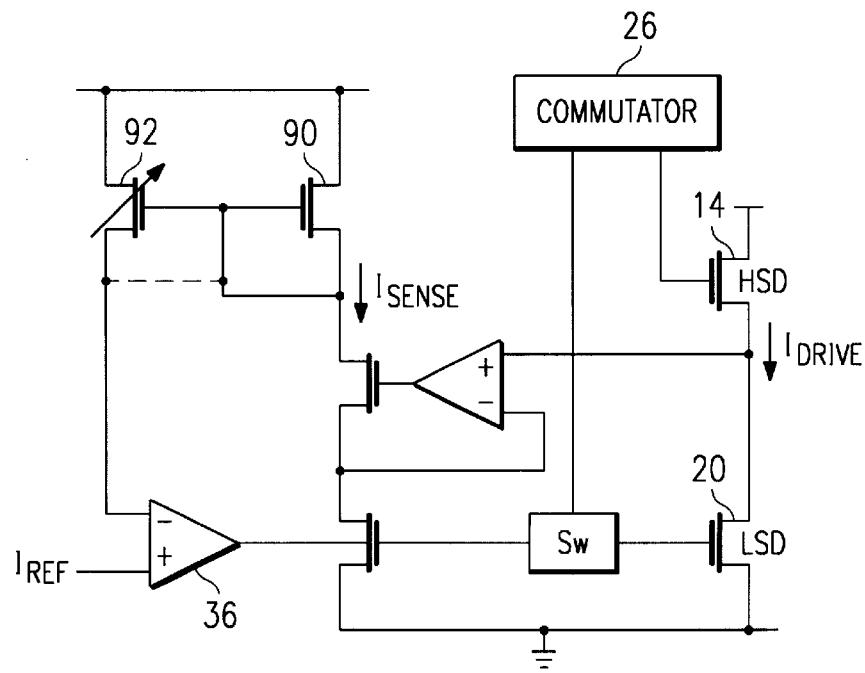

FIG. 5 is an electrical schematic diagram of a portion of an electrical driver circuit which includes a trimable current sensing transistors, in accordance with another preferred embodiment of the invention.

In the various figures of the drawing, like reference numbers are used to denote like or similar parts.

DETAILED DESCRIPTION OF THE PREFERRED EMBODIMENTS

Figure 1:
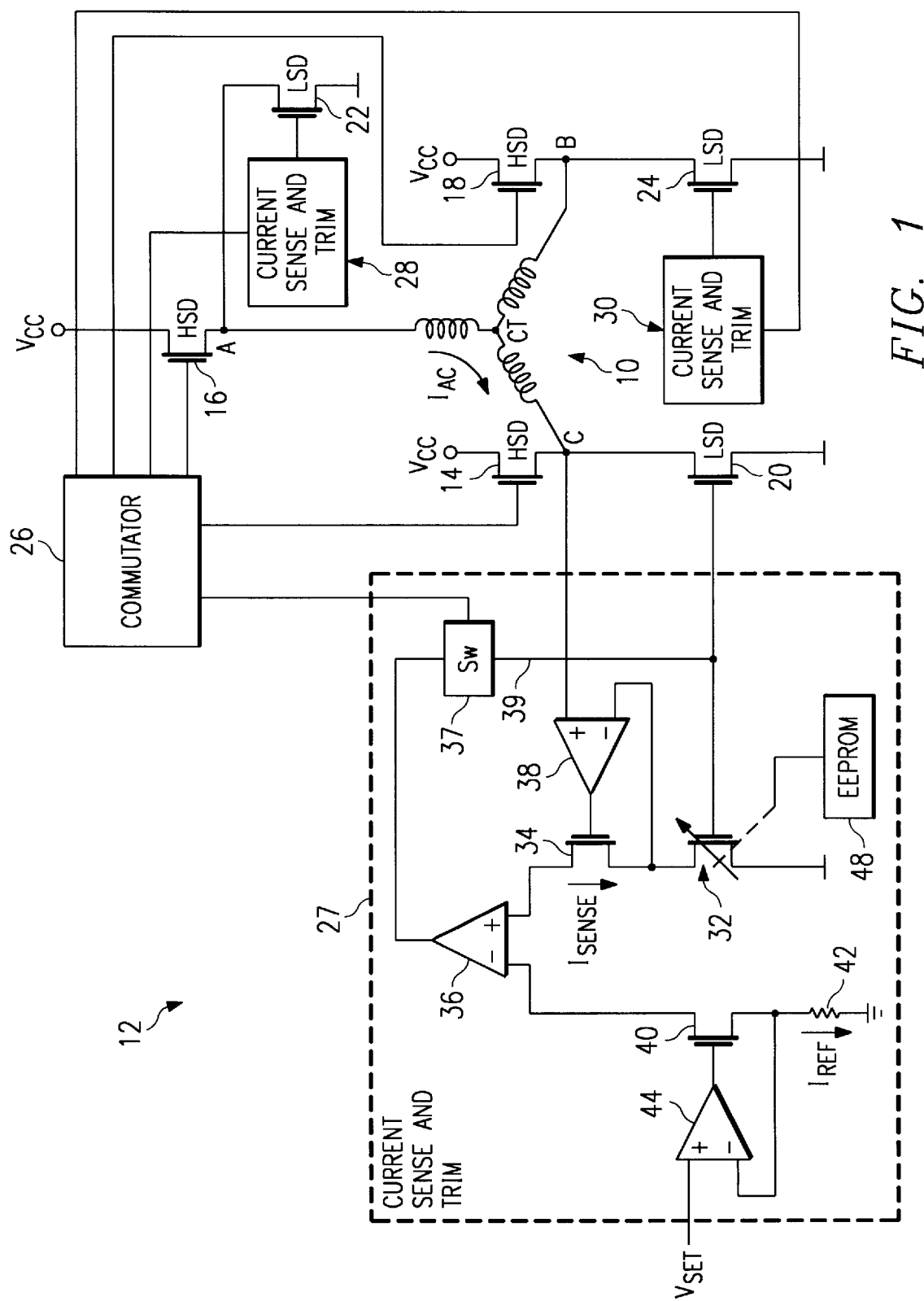
FIG. 1 is an electrical schematic diagram of a portion of a polyphase dc motor and driver circuitry incorporating trimable current sensing transistors, in accordance with a preferred embodiment of the invention.

With reference now to FIG. 1, an electrical schematic diagram of a portion of a three-phase DC motor 10 and driver circuitry 12 therefor are shown. It should be noted that although a three-phase motor is shown, the invention need not be limited to any particular number of phases, or particular modes of operation.

The stator coils of the three-phase motor are shown in FIG. 1 connected between three nodes A, B, and C and a center tap connection, CT, in a "Y" configuration. Each of the nodes A, B, and C, are connected between high side driver transistors 14, 16 and 18 and low side driver transistors 20, 22, and 24, respectively. A commutator circuit 26 selectively activates combinations of the high side driver transistors and low side driver transistors to produce current flows through selected ones of the coils 10 to produce the desired rotation of the rotor (not shown) in known fashion.

Connected to the gates of the low side driver transistors 20, 22, and 24, are respective current sense and trim circuits 26, 28, and 30. Each of the current sense and trim circuits 26, 28, and 30 are similarly constructed, the details of one which are shown in the current sense and trim circuit 26 shown in FIG. 1. More particularly, the current sense and trim circuitry 26 includes an FET transistor 32 connected to mirror the current flowing in the low side driver transistor 20. The FET transistor 32 is a selectively adjustable device, as described below in detail.

The gate of the FET 32 is connected to the gate of the FET 20, with its source and drain connected in a current flow path through which a current $I_{sense}$ flows. A second FET device 34 is provided in the current path through which the current $I_{sense}$ flows from a non-inverting input terminal of a current error amplifier 36. The output from the current error amplifier 36 is connected to the gates of the FET devices 32 and 20 by a switch 37, which is controlled by the commutator 26, on a voltage delivery line 39.

The gate of the FET 34 is connected to the output of an operational amplifier 38, the non-inverting input of which is connected to the node C of the "Y" connected coils 10 and the inverting input of which is connected between the FET devices 34 and 32.

The non-inverting input of the current error amplifier 36 is connected to a current flow path in which a reference current $I_{REF}$ flows. The current flow path includes an FET device 40 and a current setting resistor 42. An operational amplifier 44 is connected to control the gate of the FET device 40. The non-inverting input of the operational amplifier 44 is connected to receive a set voltage, $V_{SET}$, and the inverting input of the operational amplifier 44 is connected to the junction between the FET device 40 and the sense resistor 42. The circuit 26 operates to control the magnitude of the current flowing in the current flow paths which include the respective FET transistors 16 and 20 and 18 and 20, proportionally to the magnitude of the reference current $I_{REF}$ in FET 40, in known manner.

As mentioned, the FET device 32 is a selectively adjustable device, and is controlled by the programmed outputs of an EEPROM circuit 48. The effective channel width of the mirror device 32 is thus controlled by the EEPROM 48, which may be constructed on the same chip as the remainder of the sense and trim circuitry. ordinarily, the EEPROM 48 would be configured at a factory or manufacturing site; however, it may be user programmable, if desired. It will be appreciated that the function performed by the EEPROM 48 may also be performed by other programmable circuitry, such as programmable fuse devices, programmable gate devices, or the like. Thus, the overall motor driver circuit can be individually programmed to compensate for variations not only in the sense transistors, but in the other motor components as well.

Figure 2:
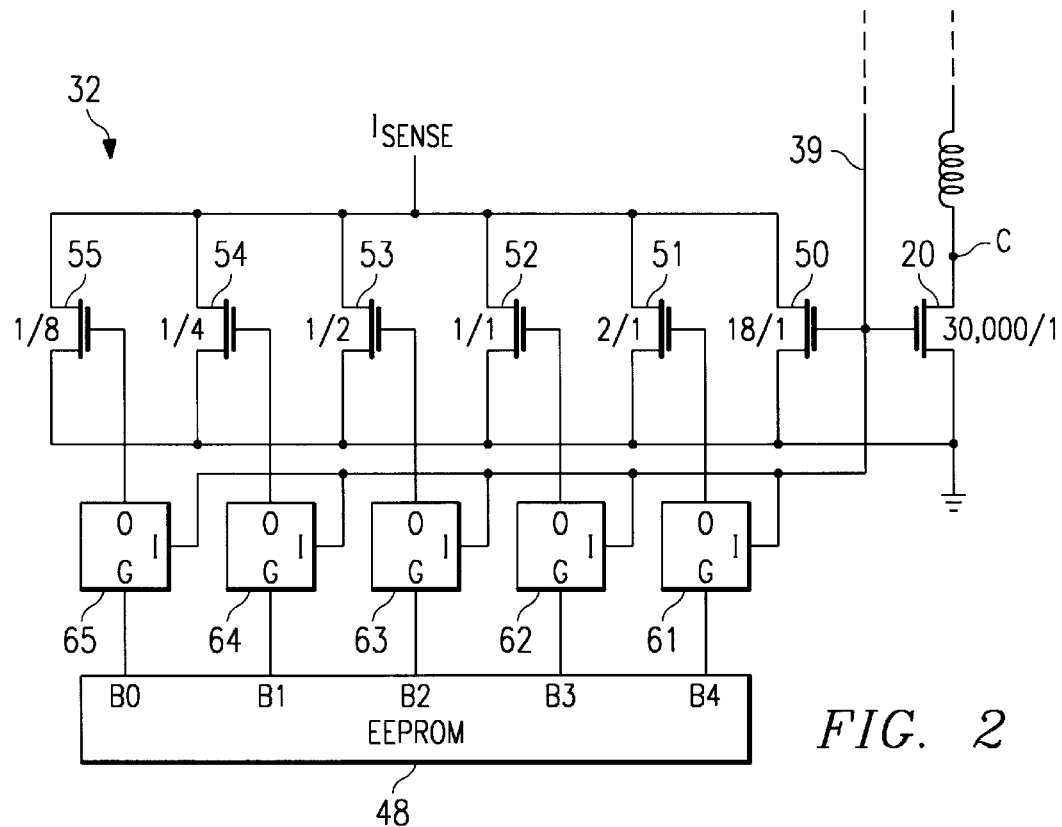
FIG. 2 is an electrical schematic diagram of a typical arrangement of a trim device of the type used in the polyphase dc motor and driver circuitry of FIG. 1, in accordance with a preferred embodiment of the invention.

The details of one embodiment of such selectively variable sensing transistor 32 is shown in FIG. 2. Thus, with reference additionally now to FIG. 2, the adjustable FET device 32 has a plurality of differently sized FET devices, six being shown for example, which may be individually, selectively connected in parallel. It should be noted that any number of devices may be employed, depending upon the application and resolution of sense current adjustment that is necessary or desired. It should also be noted that although the invention is desirably aimed at making the currents in all of the current flow paths of the polyphase motor equal, the discreet trimming by selective switching into a parallel circuit of one or more transistors necessarily results in quantized steps in trimming the circuitry. Consequently, the number of transistors that are switchably connected controls the resolution by which the currents can be made equal. In the embodiment illustrated, for example, the FET devices 50–55 have respective sizes of 18/1, 2/1, 1/1, 1/2, 1/4, and 1/8. (The ratio expressed represents the width-to-length ratio of the gate of the FET devices.) This gives a trim range of ±10% with a step size of 1%.

In the embodiment shown, moreover, the low side driver transistor 20 may be sized 30,000/1 to enable a current mirroring ratio between 1371.43/1 to 1666.67/1 to be selectively presented, depending upon which of the FET devices 51–55 are selected. To effect the selection of the FET devices 51–55, respective switches 61–65 are provided. Thus, depending upon the programmable states appearing on the output terminals B0–B4 of the EEPROM 48, selected ones of the FET devices 51–55 are turned on together with the FET device 50, which is not selectively controlled by the EEPROM 48. It should be noted that in a normal or default state, one or more of the FET devices 51–55 may normally be turned on to enable the flexibility to have a reduced current carrying capability from the nominal state. Thus, for example, FET device 51 may normally be in a default or initial state to be essentially in parallel with the sensing transistor 50. Thus, if a smaller sense current $I_{SENSE}$ is desired, the FET 51 may be turned off, leaving only the FET sensing transistor 50 to be turned on, or if a higher sense current, $I_{SENSE}$ is desired, one or more of the remaining FET transistors 52–55 may be turned on, as needed.

It is also noted that the various selected transistors 51–55 and the main FET sensing transistor 50 are turned on and off in synchronism with the signals provided by the commutator 26. As mentioned, whether or not the signal on the gate voltage line 39 is delivered to the gate of the respective FET devices 51–55 depends upon the state of the respective switches 61–65, which, in turn, is dependent upon the output states supplied by the EEPROM 48.

Figure 3:
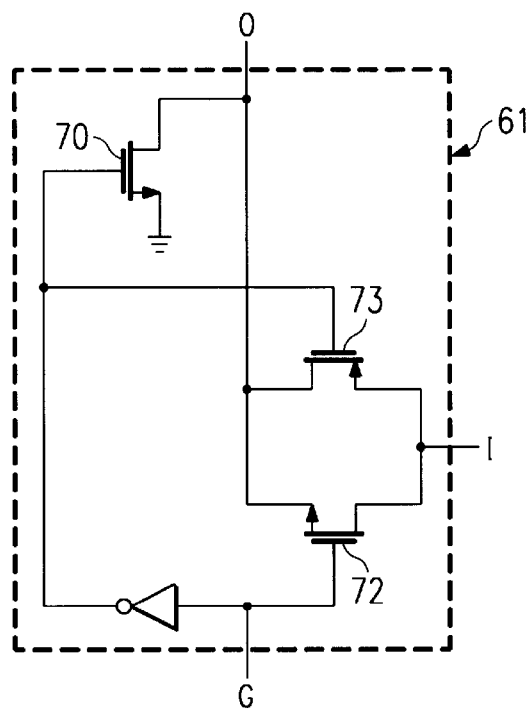
FIG. 3 is an electrical schematic diagram of a switch used to control one of the trim transistors of the trim device of FIG. 2.

With reference additionally now to FIG. 3, details of the switches 61–65 are shown. Each of the switches 61–65 is substantially similar to the other switches; consequently, only switch 61 is shown. Switch 61 has three input terminals, labeled G, I, and O. The input, I, from the commutator 26 is selectively applied to the output, connected to the gate of one of the FET devices 51–55, in dependence upon the state applied to input terminal G from the EEPROM 48. Thus, it can be seen that if the state applied to terminal G is low, the n-channel transistor 70 will be turned on, forcing the output on line O also to be low. On the other hand, if the state applied to input terminal G is high, the n-channel transistor 70 will be turned off, allowing the signal on the input terminal I to be passed via n-channel transistor 72 and the p-channel transistor 73 directly to the output terminal O.

Figure 4:
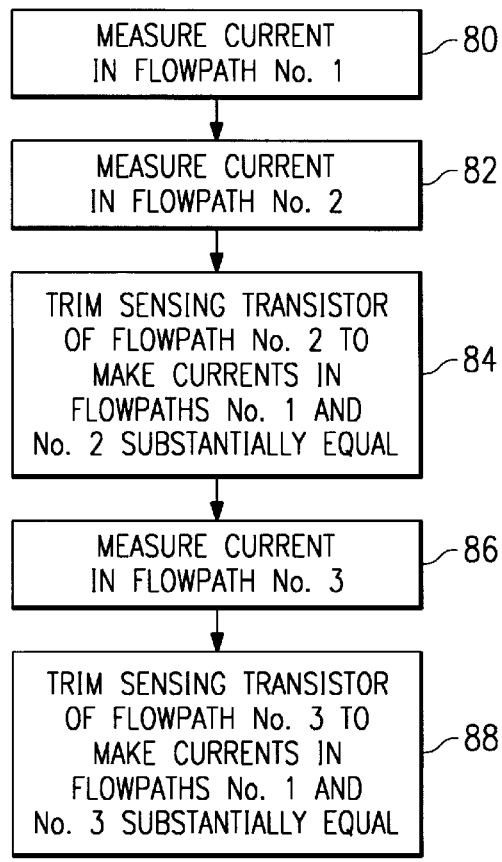
FIG. 4 is a flowchart illustrating the steps of a method for equalizing the currents in the flowpaths of the polyphase motor and driver circuitry of FIG. 1, in accordance with a preferred embodiment of the invention.

With reference once again to FIG. 1 and additionally to FIG. 4, the operation of the adjustable sensing transistors in the circuit can be established during an initial testing operation, the steps of which are detailed in FIG. 4. More specifically, the motor driver circuit 12 is connected to the stator coils of a polyphase dc motor with which it will be associated, and the current that flows in a first current flow path is measured, as indicated by box 80. The first current flow path may be, for example, the current flow path through the high side driver 14 and low side driver 22. Then, as indicated by box 82, the current that flows in a second current flow path is measured. The second current flow path may be, for example, the current flow path that includes the high side driver 18 and the low side driver 20.

By calculation or by trial and error, the current flow through the adjustable sense transistor 32 is adjusted by programming the EEPROM to selectively connect one or more of the FET devices 51–55 in parallel with the sensing FET 50, until the current in the second current flow path substantially equals the current in first current flow path, as indicated by box 84. Finally, preferably, the current in the third current flow path which includes the high side driver 16 and low side driver 24 is measured, as indicated by box 86, and the adjustable transistor contained in the current sense and trim circuit 30 is adjusted in a similar manner to that described above with reference to the adjustable transistor 32 to make the current in the first current flow path substantially equal to the current in third current flow path, as shown by box 88.

It is noted that in the trim process, the adjustable sensing transistor in the current sense and trim circuit 28 may be left at its pre-established nominal value, if desired, and only the transistors in the current sense and trim circuits associated with the two other current flow paths need be adjusted. On the other hand, if the current variations are so great as to require adjustment of the sensing FET in the current sense and trim circuit 28, the flexibility is present to enable that adjustment to be made as well.

Although the sensing transistor, such as the sense transistor 32 in the current sense and trim circuit 26 has been shown to be adjustable, other locations may be selected in the current sense and trim circuitry 26 for the provision of an adjustable device that will affect the current flowing in the current flow path of the coils of the polyphase motor with which the driver circuit is associated. For example, with reference now to FIG. 5, an alternative preferred embodiment is shown in which an adjustable FET device is provided in a current flow path through which the reference current flows, and against which the driving current may be compared.

More specifically, a current mirror is provided in the current flow path through which a sensing current, $I_{sense}$ flows, including an FET device 90 in the $I_{sense}$ current flow path. An adjustable FET device 92 is provided to mirror the current in the current flow path carrying $I_{sense}$, to provide a voltage on a current error amplifier 36 to directly adjust the current in the primary current flow path through the high side driver 14 and low side driver 20. Those skilled in the art will find other locations for the variable current carrying device and capabilities provided by the variable FET structure described herein.

Thus, it can be seen that through the use of the adjustable sensing transistor, in accordance with the invention, the ratio of the mirror device to power device can be adjusted on a per chip basis so that high accuracy in measured current is achieved without the use of expensive sense resistors.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for adjusting a driver for a polyphase dc motor in which a plurality of currents are commutatively applied to selective sets of motor coils, comprising:

measuring a first commutatively applied current that is applied to a first set of coils of said polyphase dc motor;

measuring a second commutatively applied current that is applied to a second set of coils of said polyphase dc motor;

and changing a magnitude of said first commutatively applied current to more closely equal a magnitude of said second commutatively applied current from an original magnitude.

2. The method of claim 1 further comprising:

measuring a third commutatively applied current that is applied to a third set of motor coils;

and changing a magnitude of said third commutatively applied current to more closely equal a magnitude of said second commutatively applied current from an original magnitude.

3. The method of claim 1 wherein said step of changing a magnitude of said first commutatively applied current comprises selectively connecting at least one active device having a current path in parallel with an active device connected to mirror a current in a power transistor.

4. The method of claim 3 wherein said step of selectively connecting at least one active device having a current path in parallel with an active device connected to mirror a current in a power transistor comprises selectively connecting a trim FET having a first channel width to length ratio in parallel with a current mirror FET, having a second channel width to length ratio.

5. A method for adjusting a driver for a polyphase dc motor of the type having sets of motor windings, comprising:

commutatively applying motor drive currents to selected sets of said motor windings;

measuring the amplitude of at least two of said drive currents;

changing the amplitude of at least one of said at least two drive currents to make said at least two drive currents substantially equal.

6. The method of claim 5 further comprising:

measuring another commutatively applied current that is applied to another set of motor coils;

and changing a magnitude of said another commutatively applied current to make said another drive current substantially equal to said at least two drive currents.

7. The method of claim 5 wherein said step of changing the amplitude of at least one of said at least two drive currents to make said at least two drive currents substantially equal comprises selectively connecting at least one active device having a current path in parallel with an active device connected to mirror and control a current in a power transistor for one of said drive currents.

8. The method of claim 7 wherein said step of selectively connecting at least one active device having a current path in parallel with an active device connected to mirror and control a current in a power transistor for one of said drive currents comprises selectively connecting a trim FET having a first channel width to length ratio in parallel with a current mirror FET having a second channel width to length ratio.

9. A circuit for operating a polyphase dc motor comprising:

a driver circuit for controlling currents flowing in current paths that include respective sets of coils of a polyphase dc motor to which said driver circuit is connectable;

a plurality of circuits for sensing and controlling the currents in respective ones of said current paths;

programmable circuitry connected to adjust at least one of the sense current circuits to control a current flowing through at least one set of coils of said polyphase motor to substantially equal a current flowing through at least one other set of coils of said polyphase motor.

10. The circuit of claim 9 wherein said circuits for sensing and controlling the currents in respective ones of said current paths are FET devices.

11. The circuit of claim 10 wherein said FET devices are connected in parallel, and said programmable circuit programmably selects said FET devices to control an effective channel width provided by said FET devices.

12. The circuit of claim 10 wherein said FET devices are connected in parallel, and said programmable circuit programmably selects said FET devices to control an effective channel width provided by said FET devices by selectively connecting a trim FET having a first channel width to length ratio in parallel with a current mirror FET, having a second channel width to length ratio.

13. The circuit of claim 9 wherein said polyphase dc motor is a three-phase dc motor.

14. The circuit of claim 9 wherein said sets of coils are "Y" connected coils.

15. A motor driver circuit for providing drive signals to stator coils of a polyphase dc motor, comprising:
- a plurality of current paths, each connected between a supply voltage and a reference potential, each current path comprising two driver transistors, a node of each of said stator coils being connectable between said driver transistors in respective current flow paths;
- a commutator connected to operate said driver transistors in a sequence in which drive currents are delivered for application in a predetermined sequence to said stator coils;
- a plurality of sensing transistors, each connected to produce a mirror current which mirrors a mirrored current in an associated driver transistor in a respective current flow path;
- circuitry responsive to the mirror currents of said sensing transistors to control the amplitudes of said currents in said associated driver transistor in a respective current flow path;
- at least one trim transistor, each connected in parallel with a respective one of said sensing transistors; and
- a programmable circuit connected to selectively activate said at least one trim transistor to adjust the amplitudes of the mirrored currents in the current flow path with which the sensing transistor with which the at least one trim transistor is associated.

16. The motor driver circuit of claim 15 wherein said sensing and trim transistors are FET devices.

17. The motor driver circuit of claim 15 wherein polyphase dc motor is a three-phase motor.

18. The motor driver circuit of claim 17 wherein said stator coils are connected in a "Y" configuration.

19. The motor driver circuit of claim 18 wherein said plurality of current paths include three current paths and said plurality of sensing transistors include three sensing transistors.

20. A motor assembly, comprising:
- a polyphase dc motor having a plurality of stator coils;
- a plurality of current paths, each connected between a supply voltage and a reference potential, each current path comprising two driver transistors, a node of each of said stator coils being connected between said driver transistors in respective current flow paths;
- a commutator connected to operate said driver transistors in a sequence to deliver drive currents in a predetermined sequence to said stator coils;
- a plurality of sensing transistors, each connected to produce a mirror current which mirrors a mirrored current in an associated driver transistor in a respective current flow path;
- circuitry responsive to the mirror currents of said sensing transistors to control the amplitudes of said currents in said associated driver transistor in a respective current flow path;
- at least one trim transistor, each connected in parallel with a respective one of said sensing transistors; and
- a programmable circuit connected to selectively activate said at least one trim transistor to adjust the amplitudes of the mirrored currents in the current flow path with which the sensing transistor with which the at least one trim transistor is associated.

21. The motor assembly of claim 20 wherein said sensing and trim transistors are FET devices.

22. The motor assembly of claim 20 wherein polyphase dc motor is a three-phase motor.

23. The motor assembly of claim 22 wherein said stator coils are connected in a "Y" configuration.

24. The motor assembly of claim 20 wherein said plurality of current paths include three current paths and said plurality of sensing transistors include three sensing transistors.

* * * * *